US008646179B2

(12) United States Patent
Law et al.

(10) Patent No.: US 8,646,179 B2
(45) Date of Patent: Feb. 11, 2014

(54) METHOD FOR APPLYING NANOCOATINGS WITH EASY CLEAN AND SELF-CLEAN CAPABILITY ON A PRINTHEAD

(75) Inventors: Kock-Yee Law, Penfield, NY (US); Yuanjia Zhang, Rochester, NY (US); Varun Sambhy, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 711 days.

(21) Appl. No.: 12/860,228

(22) Filed: Aug. 20, 2010

(65) Prior Publication Data

US 2012/0042518 A1 Feb. 23, 2012

(51) Int. Cl.
*B21D 53/76* (2006.01)
*B23P 17/00* (2006.01)
*B41J 2/015* (2006.01)

(52) U.S. Cl.
USPC .......... 29/890.1; 347/20

(58) Field of Classification Search
USPC .......... 29/890.1; 347/20, 40, 44
See application file for complete search history.

(56) References Cited

U.S. PATENT DOCUMENTS

| | | | | | |
|---|---|---|---|---|---|
| 4,704,420 | A | * | 11/1987 | Federici et al. | 524/233 |
| 4,863,986 | A | * | 9/1989 | Re et al. | 524/197 |
| 4,889,560 | A | | 12/1989 | Jaeger et al. | |
| 4,889,761 | A | * | 12/1989 | Titterington et al. | 428/32.1 |
| 5,221,335 | A | * | 6/1993 | Williams et al. | 524/560 |
| 5,372,852 | A | * | 12/1994 | Titterington et al. | 427/288 |
| 5,432,539 | A | * | 7/1995 | Anderson | 347/33 |
| 5,621,022 | A | * | 4/1997 | Jaeger et al. | 523/161 |
| 5,867,180 | A | * | 2/1999 | Katayama et al. | 345/542 |
| 5,867,189 | A | * | 2/1999 | Whitlow et al. | 347/47 |
| 6,071,564 | A | * | 6/2000 | Marchetti et al. | 427/385.5 |
| 6,821,327 | B2 | * | 11/2004 | Jaeger et al. | 106/31.29 |
| 7,047,643 | B2 | * | 5/2006 | Maeda et al. | 29/890.1 |
| 7,211,131 | B2 | * | 5/2007 | Banning et al. | 106/31.29 |
| 7,259,275 | B2 | * | 8/2007 | Belelie et al. | 560/169 |
| 7,271,284 | B2 | * | 9/2007 | Toma et al. | 560/169 |
| 7,276,614 | B2 | * | 10/2007 | Toma et al. | 554/37 |
| 7,279,587 | B2 | * | 10/2007 | Odell et al. | 554/37 |
| 7,622,580 | B2 | * | 11/2009 | Banning et al. | 546/61 |
| 8,096,649 | B2 | * | 1/2012 | Sambhy et al. | 347/101 |
| 8,156,650 | B2 | * | 4/2012 | Cha et al. | 29/890.1 |
| 2004/0077887 | A1 | * | 4/2004 | Banning et al. | 552/237 |
| 2004/0082801 | A1 | * | 4/2004 | Jaeger et al. | 552/225 |
| 2007/0123606 | A1 | * | 5/2007 | Toma et al. | 523/160 |
| 2008/0316247 | A1 | * | 12/2008 | Cellura et al. | 347/19 |
| 2009/0046125 | A1 | * | 2/2009 | Nystrom et al. | 347/44 |

OTHER PUBLICATIONS

New U.S. Patent Application in the name of Sambhy et al., entitled "Thermally Stable Oleophobic Low Adhesion Coating for Inkjet Printhead Front Face", filed Aug. 20, 2010.
U.S. Appl. No. 12/625,442 to Kovacs et al., filed Nov. 24, 2009.

* cited by examiner

*Primary Examiner* — David Angwin
(74) *Attorney, Agent, or Firm* — Oliff PLC

(57) ABSTRACT

A method for producing an inkjet printhead that includes aligning and stacking together an aperture plate and a plurality of jetstack plates; bonding together the aperture plate and plurality of jetstack plates; after the bonding step, depositing a layer of coating material to a surface of the aperture plate by inkjet printing to form a coating on at least a portion of the surface of an outlet surface of the aperture plate; and curing the layer of coating material to form a cured coating. The method may also include forming a second cured coating.

26 Claims, 2 Drawing Sheets

METHOD FOR APPLYING NANOCOATINGS WITH EASY CLEAN AND SELF-CLEAN CAPABILITY ON A PRINTHEAD

TECHNICAL FIELD

This disclosure is directed to methods for applying a coating material on an aperture face of an inkjet printhead. More particularly, described herein are methods for applying nanocoatings with easy-clean and self-clean capability on an inkjet printhead.

BACKGROUND

Fluid inkjet systems typically include one or more printheads having a plurality of inkjets from which drops of fluid are ejected towards a recording medium. The inkjets of a printhead receive ink from an ink supply chamber or manifold in the printhead which, in turn, receives ink from a source, such as a melted ink reservoir or an ink cartridge. Each inkjet includes a channel having one end in fluid communication with the ink supply manifold. The other end of the ink channel has an orifice or nozzle for ejecting drops of ink. The nozzles of the inkjets may be formed in an aperture or nozzle plate that has openings corresponding to the nozzles of the inkjets.

During operation, drop ejecting signals activate actuators in the inkjets to expel drops of fluid from the inkjet nozzles onto a recording medium. By selectively activating the actuators of the inkjets to eject drops as the recording medium and/or printhead assembly are moved relative to one another, the deposited drops can be precisely patterned to form particular text and graphic images on the recording medium. An example of a full width array printhead is described in U.S. Patent Application Publication No. 2009/0046125, the entire disclosure of which is hereby incorporated by reference herein. An example of an ultra-violet (UV) curable gel ink that can be jetted in such a printhead is described in U.S. Patent Application Publication No. 2007/0123606, the entire disclosure of which is hereby incorporated by reference herein. An example of a solid ink that can be jetted in such a printhead is the Xerox ColorQube™ cyan solid ink available from Xerox Corporation. U.S. Pat. No. 5,867,189, the entire disclosure of which is hereby incorporated by reference herein, describes an inkjet printhead including an ink ejecting component that incorporates an electropolished ink-contacting or orifice surface on the outlet side of the printhead.

Difficulties encountered with fluid inkjet systems include wetting, drooling, and flooding of inks onto the printhead front face. In addition, high ink adhesion of the front face causes ink adhering to the front face. Even with wiping, residue may remain and cause contamination. This contamination of the printhead front face can cause or contribute to blocking of the inkjet nozzles and channels, which alone or in combination with the wetted, contaminated front face can cause or contribute to non-firing or missing drops, undersized or otherwise wrong-sized drops, satellites, or misdirected drops on the recording medium and thus result in degraded print quality.

Maintenance procedures have been implemented in inkjet printers for preventing and clearing inkjet blockages and for cleaning the printhead front face. A maintenance procedure for inkjet printers is described in U.S. Patent Application Publication No. 2008/0316247, the entire disclosure of which is hereby incorporated by reference herein. Examples of maintenance procedures include jetting or purging ink from the inkjet channels and nozzles and wiping the printhead front face. Jetting procedures typically involve ejecting a plurality of drops from each inkjet in order to clear contaminants from the jets. Purging procedures typically involve applying an air pressure pulse to the ink reservoir to cause ink flow from all of the jets. The jetted ink may be collected in a waste reservoir such as a spittoon. The purged ink may be collected in a waste reservoir such as a waster tray. A printhead front face with high ink adhesion can be wetted and contaminated by jetted or purged ink, which may interfere with the collecting of the purged ink by preventing or reducing the ability of the ink to slide over the front face into the waste reservoir. Wiping procedures are usually performed by a wiper blade that moves relative to the nozzle plate to remove ink residue, as well as any paper, dust, or other debris that has collected on the printhead front face. An example of a wiper assembly is described in U.S. Pat. No. 5,432,539, the entire disclosure of which is hereby incorporated by reference herein. Jetting/purging and wiping procedures may each be performed alone or in conjunction with one another. For example, a wiping procedure may be performed after ink is purged through the jets to wipe excess ink from the nozzle plate.

Various coating materials have been proposed for printhead front faces. These coating materials may exhibit one or more advantageous properties, such as anti-weeping, anti-drooling, anti-flooding, anti-contamination, and easy-clean, self-clean properties. While currently available coatings for inkjet printhead front faces are suitable for their intended purposes, it is challenging to form a uniform, micron thick coating on a printhead front face using conventional coating technologies, such as sputtering, dipping, flowing, and chemical vapor deposition without partially or completely covering or clogging the nozzles.

The appropriate components and process aspects of each of the foregoing U.S. Patents and Patent Application Publications may be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure.

SUMMARY

Disclosed herein is a method for producing an inkjet printhead, the method comprising aligning and stacking together an aperture plate and a plurality of jetstack plates; bonding together the aperture plate and plurality of jetstack plates; and depositing a layer of coating material to a surface of the aperture plate by inkjet printing to form a coating on at least a portion of the surface of the aperture plate.

EMBODIMENTS

For convenience, the methods disclosed herein will be described in conjunction with the manufacture of one form of an inkjet printhead shown in FIG. 1 and as described in greater detail in U.S. Pat. No. 5,867,189 to Whitlow et al. It is to be understood that the methods are not limited to the manufacture of this particular type of inkjet printhead. Instead, the methods have broad applicability to inkjet printhead manufacture in general where it is desired to apply one or more coating material to a surface of an aperture plate. The methods may be used to make inkjet printheads that dispense inks that are liquid at room temperature as well as hot melt or phase change inks that are solid at room temperature and are melted for ejection.

Figure 1:
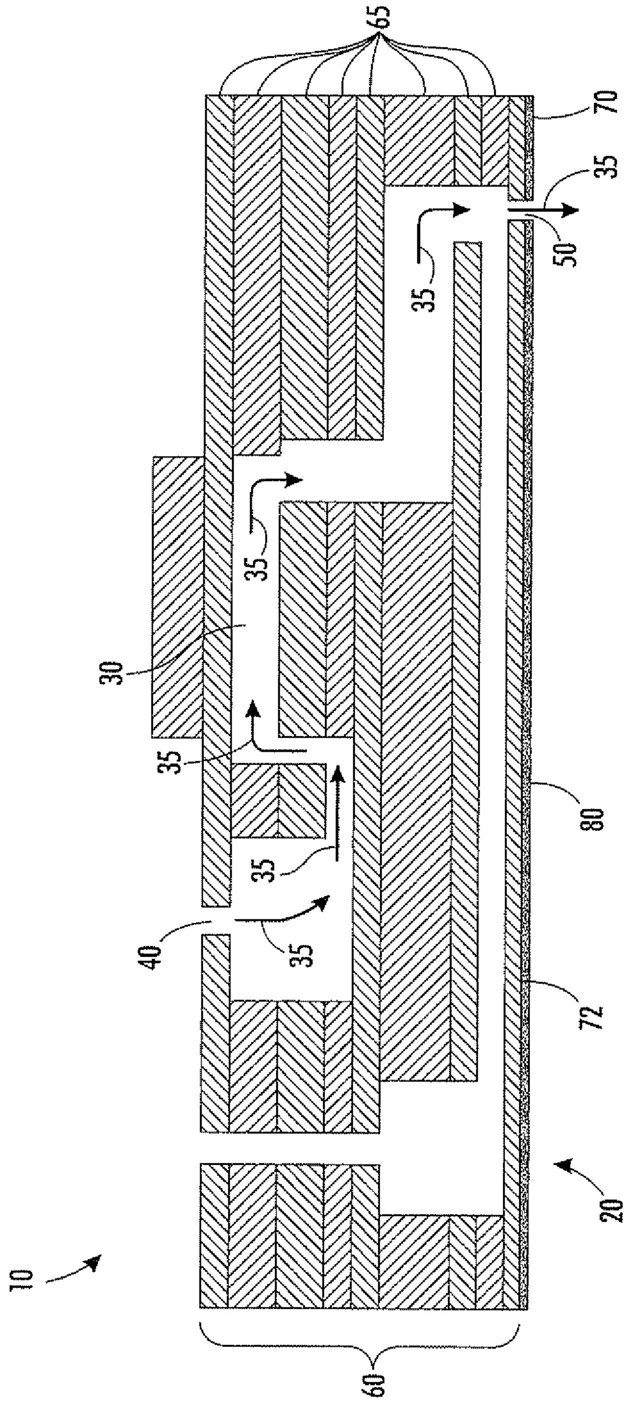
FIG. 1 is a schematic cross-sectional view of an inkjet printhead having a coating disposed on the aperture plate.

FIG. 1 illustrates an inkjet printhead 10 having a coating disposed thereon in accordance with the present disclosure. In FIG. 1, the printhead 10 has a body 20 comprised of a plurality of laminated plates or sheets 65 fabricated, for example, from stainless steel. These sheets 65 are aligned and stacked in a superposed relationship to form a jetstack 60. Jetstack sheets 65 may be etched or otherwise configured so that the jetstack has channels, chambers, and/or passageways. For example, as shown in FIG. 1, printhead 10 includes one or more ink pressure chamber 30 coupled to or in fluid communication with one or more ink source 40.

Inkjet printhead 10 also has an aperture plate 70 that is aligned and stacked in a superposed relationship with jetstack 60. Aperture plate 70 has one or more opening 50, also referred to herein as an orifice, aperture, or ink ejection nozzle, that is coupled to or is in fluid communication with an ink pressure chamber 30 by way of an ink passage indicated by arrows 35. Ink passes through nozzle 50 during ink drop formation. Ink drops travel in a direction along path 35 from nozzle 50 towards a print medium (not shown) that is spaced from nozzle 50.

A typical inkjet printhead includes a plurality of ink pressure chambers 30 with each pressure chamber 30 coupled to one or more nozzle 50. For simplification, a single nozzle 50 is illustrated in FIG. 1. As shown in FIG. 2A, the aperture plate 70 may be configured with a plurality of nozzles 50 or an array of nozzles 50.

Aperture plate 70 defines at least a portion of an outlet side of printhead 10. Disposed or deposited on at least a portion of the outlet surface 72 of the aperture plate 70 facing the outlet side of printhead 10 is a layer of a coating material 80. The layer of coating material 80 may have any suitable thickness, such as from about 500 to about 5,000 nm, or from about 1,000 to about 5,000 nm, or from about 500 to about 2,500 nm, or from about 2,000 to about 4,000 nm, or about 3,000 nm. If the layer is too thick, the probability of impeding the ink droplet path increases. On the other hand, having a layer that is too thin may lead to incomplete coverage, or the layer cannot sustain a large number of wiping operations.

The outer surface of the layer of coating material deposited on the outlet surface or front face of the aperture plate, and any portions of the outlet surface or front face of the aperture plate not covered by the layer of coating material is referred to herein as the aperture face, printhead print face, or the ink contacting surface.

The aperture plate may also be referred to as an orifice plate, nozzle plate, or printhead front face plate. The aperture plate may be made of a suitable material or composition, such as stainless steel, steel, nickel, copper, aluminum, polyimide, and silicon, and may be of any configuration suitable to the device. Aperture plates of square or rectangular shapes are typically selected due to ease of manufacture. Aperture plates may be made of stainless steel selectively plated with a braze material such as gold.

The jetstack sheets or plates, and the aperture plate, may be bonded together by any suitable method known in the art. In some embodiments, for example, the plates are stacked together and aligned, then subjected to a diffusion bonding process, and then subjected to a brazing process.

During the diffusion bonding process, the plates are subjected to a temperature of about 550° C. and 400 to 40,000 psi of pressure to form an intimate contact between the plates that is free of voids. This step also establishes initial bonding between the plates. Brazing of inkjet printhead metal plates is described in the art, such as, for example, in U.S. Pat. No. 4,875,619, the entire disclosure of which is totally incorporated herein.

The aperture plate may be coated with the coating material after the plates are bonded together, because most polymeric (organic) materials will decompose at temperatures above 300° C.

In embodiments, the coating material is deposited onto the aperture plate using inkjet printing. Inkjet printing of the coating materials allows precise positioning and depositing of a wide range of polymers or organic materials. For example, in some embodiments, after the jetstack and aperture plates of the printhead are bonded and brazed together, this assembly is loaded into an inkjet printer and the front face is coated with one or more coating materials. With proper control of the droplet formation process, uniform coatings can be created on the front plate without covering the nozzles.

Figure 2:
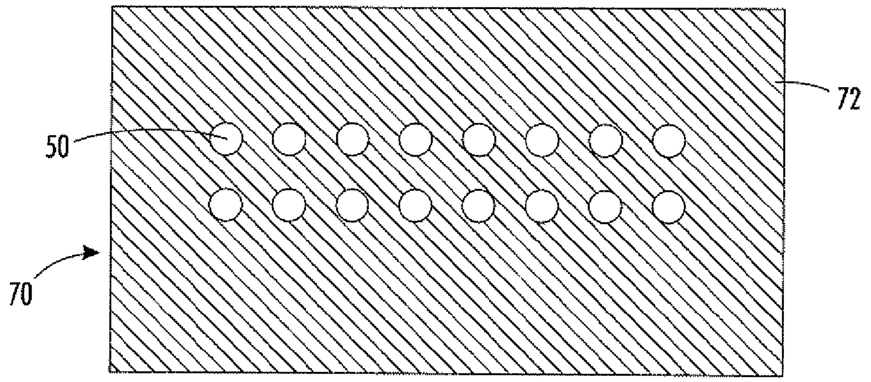
FIG. 2 is a schematic top view of an aperture plate before being coated with a coating material.
Figure 3:
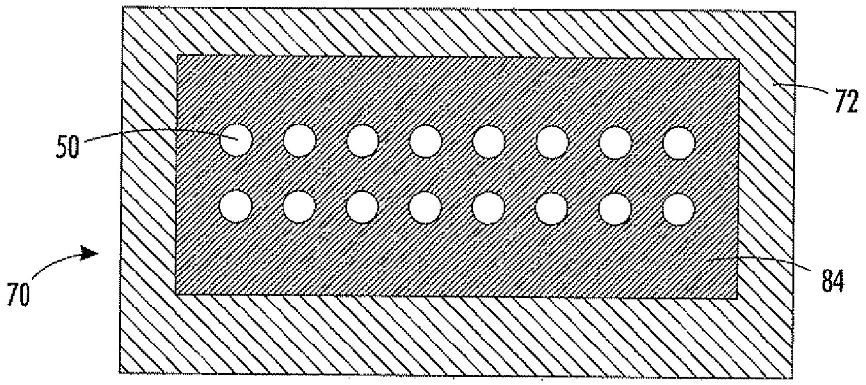
FIG. 3 is a schematic top view of an aperture plate coated with a coating material having easy clean, self-clean properties.
Figure 4:
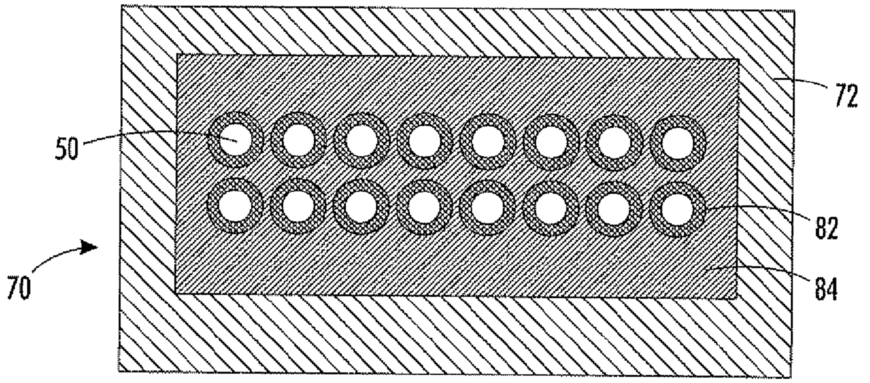
FIG. 4 is a schematic top view of an aperture plate with an anti-weeping polymeric coating material disposed around the nozzles, and a different coating material having easy clean, self-clean properties deposited on other regions of the aperture plate.

FIG. 2 is a schematic top view of an aperture plate 70 before being coated with a coating material. The top surface of the aperture plate may be partially or completely coated with a single type of coating material, wherein the coating material is deposited using inkjet printing techniques. As schematically illustrated in FIG. 3, a portion of the top surface 72 of aperture plate 70, including around nozzles 50, is coated with a coating material 84 having easy clean and self-clean properties. Because inkjet printing can be controlled with great positioning accuracy, different coating material may be applied to different portions of the aperture plate. For example, referring to FIG. 4, an anti-weeping polymeric coating material 82 is applied around the nozzles 50, and a different coating material 84 having easy clean and self-clean properties is deposited on other regions of the top surface 72 of aperture plate 70. Although coating material 84 does not extend all the way to the outside edges of surface 72 in FIGS. 3 and 4, it is to be understood that the entire surface 72 of the front plate may be coated with one or more coating materials. When two or more coating materials are to be applied to the aperture plate, different inkjet printheads may be used to deposit each coating material. The coating materials may be deposited separately or simultaneously.

Inkjet printing may be used to deposit various coating materials onto the aperture plate. Suitable coating materials include low-adhesion coating materials that resist contamination, drooling, and flooding by UV-curable phase change inks and solid inks (also referred to as phase change inks), such as those disclosed in U.S. patent application Ser. No. 12/625,442, filed Nov. 24, 2009, the entire disclosure of which is herein incorporated by reference. In some embodiments, the coatings formed by the coating material exhibit very low adhesion with UV ink and solid ink as measured by a low sliding angle so that ink drops on the printhead front face roll off and leave no residue. Applying such materials using inkjet printing deposition techniques produces inkjet printheads with front face coatings that enable the production of high quality, high throughput, digitally printed images with UV gel ink or solid ink that are free of print defects due to misdirected droplets or missing jets caused by ink adhesion to front face leading to ink drooling of the ink experienced with previous printhead front face coatings.

Low adhesion coatings may exhibit suitable abrasion characteristics for use as surface coatings for the printhead to avoid excessive wear upon usage or wiping. They can also provide the printhead front face with sliding angle characteristics such that satellite droplets of UV gel ink and solid ink landing on the nozzle plate exhibit a low sliding angle of from about 1° to less than about 30°, such as from about 1° to less than about 20°, or from about 1° to less than about 15° with the printhead front face surface having the coating. The cured low adhesion coating surface maintains a low sliding angle even after 200 cleaning cycles with a Crock cloth. Such a coating may be made by cross-linking a diisocyanate or triisocyanate with a hydroxyl-functionalized polyester in a solvent in the presence of a hydroxyl functionalized polysiloxane crosslinking material and, optionally, a second crosslinking material comprising a fluoro crosslinking material.

A low adhesion coating may comprise an oleophobic polymeric material where jetted drops of UV gel ink or solid ink exhibit a contact angle greater than 45° with the surface coating. The greater the ink contact angle the higher the holding pressure. Holding pressure measures the ability of the aperture plate to avoid ink weeping out of the nozzle when the pressure of the ink tank (reservoir) increases.

Some of the oleophobic low adhesion coatings described herein are a reaction product of a reaction mixture that includes at least one isocyanate and a hydroxyl (e.g., alcohol) functionalized fluoro-crosslinking material. In some embodiments, the hydroxyl functionalized fluoro-crosslinking material is present within the reactant mixture in a range from about 30 wt % by weight to about 90 wt %. The reaction product of an alcohol and an isocyanate may include a urethane (e.g., a polyurethane polymer). In some embodiments, the hydroxyl functionalized fluoro-crosslinking material includes at least one perfluoropolyether compound.

Suitable isocyanates include monomeric, oligomeric, and polymeric isocyanates, including those of the general formula $R_1$—$(NCO)_n$ where $R_1$ is an alkyl group, an alkylene group, an aryl group, an arylene group, an arylalkyl group, an arylalkylene group, an alkylaryl group, or an alkylarylene group.

In some embodiments, $R_1$ is an alkyl or an alkylene group (including linear and branched, saturated and unsaturated, cyclic and acyclic, and substituted and unsubstituted alkyl and alkylene groups, and where heteroatoms, such as oxygen, nitrogen, sulfur, silicon, phosphorus, or the like either may or may not be present in the alkyl or alkylene group. In some embodiments, $R_1$ is an aryl or an arylene group (including substituted and unsubstituted aryl and arylene groups, and wherein heteroatoms, such as oxygen, nitrogen, sulfur, silicon, phosphorus, or the like either may or may not be present in the aryl or arylene group). In some embodiments, $R_1$ is an arylalkyl or an arylalkylene group (including substituted and unsubstituted arylalkyl and arylalkylene groups, wherein the alkyl portion of the arylalkyl or arylalkylene group can be linear or branched, saturated or unsaturated, cyclic or acyclic, and substituted or unsubstituted, and wherein heteroatoms, such as oxygen, nitrogen, sulfur, silicon, phosphorus, or the like either may or may not be present in either the aryl or the alkyl portion of the arylalkyl or arylalkylene group).

Examples of diisocyanates include isophorone diisocyanate (IPDI), toluene diisocyanate (TDI); diphenylmethane-4,4'-diisocyanate (MDI); hydrogenated diphenylmethane-4,4'-diisocyanate (H12MDI); tetra-methyl xylene diisocyanate (TMXDI); hexamethylene-1,6-diisocyanate (HDI), naphthalene-1,5-diisocyanate; 3,3'-dimethoxy-4,4'-biphenyldiisocyanate; 3,3'-dimethyl-4,4'-bimethyl-4,4'-biphenyldiisocyanate; phenylene diisocyanate; 4,4'-biphenyldiisocyanate; 2,2,4-trimethylhexamethylene diisocyanate and 2,4,4-trimethylhexamethylene diisocyanate, tetramethylene xylene diisocyanate; 4,4'-methylenebis(2,6-diethylphenyl isocyanate); 1,12-diisocyanatododecane; 1,5-diisocyanato-2-methylpentane; 1,4-diisocyanatobutane; dimer diisocyanate and cyclohexylene diisocyanate and its isomers; uretidione dimers of HDI, IPDI, TDI, and MDI; or the like, as well as mixtures thereof. Examples of triisocyanates or their equivalents include the trimethylolpropane trimer of TDI, or the like, isocyanurate trimers of TDI, HDI, IPDI, and MDI or the like, and biuret trimers of TDI, HDI, IPDI, or the like, as well as mixtures thereof. Examples of higher isocyanate functionalities include copolymers of TDI/HDI, or the like, and MDI oligomers, as well as mixtures thereof. In some embodiments, suitable isocyanates may be obtained under the name Desmodur® for example, Desmodur N 3300®, Desmodur N 3790®, available from Bayer Materials Science, or the like or mixtures thereof.

Suitable perfluoropolyether compounds include mono- or di-hydroxyl functionalized monomeric, oligomeric, and polymeric perfluoropolyether compounds. Examples of suitable dihydroxy functionalized perfluoropolyether compounds include those of the general formula:

$$X_1—CF_2O(CF_2CF_2O)_a(CF_2O)_bCF_2—X_2$$

where a and b are integers in a range between 0 and 100, provided that at least one of a and b are not zero, and wherein each terminal functional groups $X_1$ and $X_2$ is an —R—OH group, where R is an alkylene, alkylene ether, arylene, aylalkylene, alkylarylene group, or the like. $X_1$ and $X_2$ may be the same as, or different from, each other. In some embodiments, a suitable di-functionalized perfluoropolyether compound can be represented by the formula:

$$HOCH_2CF_2O(CF_2CF_2O)_a(CF_2O)_bCF_2CH_2OH$$

In some embodiments, suitable dihydroxy functionalized perfluoropolyether compounds may be obtained under the name Fluorolink®, for example, Fluorolink D®, Fluorolink D10®, Fluorolink D10H®, Fluorolink E10®, Fluorolink E10H®, available from Solvay Solexis, or the like or mixtures thereof.

Any suitable reaction conditions for making urethane compounds, or the like, or mixtures thereof, by condensing one or more of the perfluoropolyether compounds with one or more of the isocyanates can be used to prepare the polymer of the oleophobic low adhesion printhead front face coating. Typically (although not necessarily), the reaction can be carried out at various temperatures (for example, from about 25° C. to about 160° C.) in the presence of an optional reaction catalyst, such as dibutyltin dilaurate, bismuth tris-neodecanoate, cobalt benzoate, lithium acetate, stannous octoate, triethylamine, or the like. Other exemplary catalysts include RC catalysts from Rheine Chemie. The reaction can be performed neat (i.e., without a solvent) or can optionally employ any desired or effective solvent. Examples of suitable solvents include xylene, toluene, benzene, chlorobenzene, nitrobenzene, dichlorobenzene, N-methyl pyrrolidinone, dimethyl formamide, dimethyl sulfoxide, sulfolane, hexane, tetrahydrofuran, butyl acetate, amyl acetate, HFE 7200 (3M), HFE 7500 (3M), Solvosol (Dow) and the like, as well as mixtures thereof. Another exemplary solvent that may be used is FCL 52 solvent, available from Cytonix LLC.

The wet coating can be any suitable thickness, such as, for example from about 8 to about 80 microns, or from about 30 to about 60 microns thick. The coating can be heat cured to an appropriate temperature for drying and curing. The coating can be cured at a temperature of about 130° C. for about 30 minutes to about 2 hours and optionally post-cured at a temperature of from about 250° C. to 300° C. for about 30 minutes to about 2 hours.

Another type of low adhesion coatings described herein may comprise a suitable polymer or oligomer containing an isocyanate functional group; a suitable polymer or oligomer containing a hydroxyl functional group; a suitable hydroxyl functionalized polymer or oligomer containing at least one polysiloxane unit; and optionally, a hydroxyl functionalized fluoro-crosslinking material. For example, the low adhesion coating material can comprise Components A, B, and C, where Component A is a hydroxyl functionalized polyester, such as Desmophen® (available from Bayer Materials Science); Component B is an isocyanate, such as Desmodur® or Bayhydur® (available from Bayer Materials Science); and Component C is a hydroxyl functionalized silicone modified polyacrylate crosslinking material, such as BYK-Silclean® (available from BYK Additives and Instruments).

Component A can be any suitable polymer or oligomer containing hydroxyl (—OH) functional groups. For example, Component A can be selected from the group consisting of hydroxyl functional polymers or oligomers such as polyvinyls, polystyrenes, polyacrylates, polyester, polyethers, and mixtures thereof. In a specific embodiment, Component A is a hydroxyl functional polyacrylate resin sold under the name Desmophen® A 870 BA available from Bayer Materials Science.

Component B can be any suitable polymer or oligomer containing isocyanate (—NCO) functional groups. For example, Component B can be selected from the group consisting of isocyanate functional polymers or oligomers such as polyvinyls, polystyrenes, polyester, polyacrylates, and mixtures thereof. The isocyanate can be selected from the group consisting of diphenylmethane diisocyanate, toluene diisocyanate, hexamethylene diisocyanate, isophorone diisocyanate, or suitable polymer or oligomer containing isocyanate (—NCO) functional groups, and mixtures thereof. In a specific embodiment, Component B is a solvent-free aliphatic isocyanate resin based on hexamethylene diisocyanate sold under the name Desmodur® N 3300 A available from Bayer Materials Science.

Component C can be any suitable hydroxyl functionalized polymer or oligomer containing one or more polysiloxane units. For example, Component C can be selected from hydroxyl functionalized polymers or oligomers containing one or more polysiloxane units, such as polyvinyls, polystyrenes, polyacrylates, polyethers, and mixtures thereof. In some embodiments, Component C is a polymer consisting of polysiloxane side-chains on a hydroxyl-functional polyacrylate backbone sold under the name BYK-Silclean® 3700 available from BYK Additives and Instruments.

Component D comprises a fluoro-crosslinking material. Any suitable fluoro-crosslinking material can be selected such as a hydroxyl functionalized polymer modifier sold under the name Fluorolink®, for example, Fluorolink-D®, Fluorolink-D10H®, or Fluorolink-E10H®, available from Solvay Solexis.

The components of the low adhesion coating can be present in any suitable amount. For example, Component A can be present in an amount of from about 40 to about 80 wt %, or from about 55 to 70 wt % based upon the total weight of the low adhesion coating, although not limited. Component B can be present in an amount of from about 15 to about 50 wt %, or from about 20 to about 45 wt % based upon the total weight of the low adhesion coating, although not limited. Component C can be present in an amount of from about 0.1 to about 15 wt %, or from about 1 to about 10 wt % based upon the total weight of the low adhesion coating, although not limited. Optional Component D, if present, can be present in an amount of from about 0.01 to about 5 wt %, or from about 0.1 to about 3 wt % based upon the total weight of the low adhesion coating, although not limited.

For coating on aperture plates with nozzles, after application of the coating, a vacuum can optionally be applied to remove excess coating solution that may remain in the ejector channels or inkjet orifices. Purging with pressurized air can also be used to remove coating from the channels or orifices by forcing the coating therethrough.

The wet coating can be any suitable thickness, such as, for example from about 8 to about 80 microns, or from about 30 to about 60 microns thick. The coating can be heat cured to an appropriate temperature for drying and curing. The coating may be heated to a temperature of from about 100° C. to about 180° C. for about 5 to about 120 minutes, or from about 120° C. to about 150° C. for about 15 to about 60 minutes, or from about 130° C. to about 140° C. for about 20 to about 40 minutes.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Example 1

Preparation of Oleophobic Low Adhesion Coating with Fluorolink-D® Cross-Linker 5.5 grams of Fluorolink-D® (from Solvay-Solexis), 1.5 grams of Desmodur® 3300, 1.0 grams of Desmodur® 3790 (from Bayer), 0.05 grams of RC catalysts, and 85 mL FCL52 solvent (from Cytonix) were mixed in a beaker. The contents were stirred for 30 minutes at 25° C. and were then coated on polyimide substrate using a drawbar coater. The coatings were first heat-cured in an oven at 130° C. for 30 min. The film obtained was subjected to a second curing step at high temperature in a furnace, by ramping up the temperature at a rate of 5° C./min from room temperature to 290° C. and then remained at 290° C. for 30 min.

Contact angle and sliding angle of the film was determined on an OCA20 goniometer from Dataphysics, which consists of a computer-controlled automatic liquid deposition system, computer controlled tilting stage, and a computer-based image processing system. In a typical static contact angle measurement, about 5 microliters of hexadecane or about 3 microliters of UV ink (at typical ink jetting temperature of 80° C.), and 1 microliter of solid ink (at typical ink jetting temperature of 115° C.) were gently deposited on the testing surface and the static angle was determined by the computer software (SCA20) and each reported data is an average of >5 independent measurements. Sliding angle measurement was done by tilting the base unit at a rate of 1°/sec with an about 10 microliter droplet for hexadecane, UV ink (at typical ink jetting temperature of 80° C.), and solid ink (at typical ink jetting temperature of 115° C.) using titling base unit TBU90E. The sliding angle is defined as the inclination angle of a coated polyimide substrate at which the test droplets (hexadecane, UV ink, or solid ink) began to slide off the coated polyimide substrate without leaving residue or stain behind. Table 1 summarizes the contact angle and sliding angle data for the coating prepared above.

TABLE 1

| Coating | Solid Ink Contact Angle (Sliding Angle) | UV Ink Contact Angle (Sliding Angle) | Hexadecane Contact Angle (Sliding Angle) |
|---|---|---|---|
| 1 | 78.3° (2.0°) | 61.0° (4.0°) | 68.1° (7°) |

Example 2

Preparation of Oleophobic Low Adhesion Coating with Silclean 3700 Cross-Linker 19.6 grams of hydroxyl-terminated polyacrylate, Desmophen® A870 BA from Bayer Material Science, and 10.3 grams of hexamethylene diisocyanate, Desmodur® N-3300A from Bayer Material Science, were mixed in n-butyl acetate. The polysiloxane crosslinking material, Silclean® 3700, a hydroxyl functional silicone modified polyacrylate from BYK, was added in varying amounts, typically from 0 to 10% by weight relative to the total solid polymer weight of the formulation (does not include weight of solvent). All of the components and solvent were stirred in a beaker and the resulting coating formulation was cast onto a Mylar® sheet using a drawbar coater. The coating was cured and dried at 135° C. for about 30 to about 60 minutes, yielding the low-adhesion coating disclosed herein. The contact angle and slide angle of the coating were measured using the procedure described in Example 1.

TABLE 2

| Coating | Solid Ink Contact Angle (Sliding Angle) | UV Ink Contact Angle (Sliding Angle) | Hexadecane Contact Angle (Sliding Angle) |
|---|---|---|---|
| 2 | 54° (10°) | 40° (11°) | 34° (2°) |

Example 3

Ink-Jetting Coating of Printhead 1

A stainless steel printhead, prepared using the process described in U.S. Pat. No. 5,867,189 was fixed onto an in-house printer platen with the aperture plate face up. A pattern file containing the pattern of the nozzle of the aperture plate was loaded to the driver computer. The low adhesion coating solution prepared in accordance to the procedure described in Example 1 was filled into the inkjet cartridge. A print job was then run at 20 μm dot spacing with 3 passes on the aperture plate. The resulting coating was then cured at 130° C. for 30 min and further post-cured at 290° C. for 30 min. This resulted in a printhead with a coated aperture plate that exhibits a solid ink contact angle of ~78° and a solid ink sliding angle of ~2°.

Example 4

Ink-Jetting Coating of Printhead 2

A stainless steel printhead, prepared using the process described in U.S. Pat. No. 5,867,189 was fixed onto an in-house printer platen with the aperture plate face up. The aperture plate of the printhead was coated by the ink jet printing process with the coating solution as prepared in Example 2. The resulting coating was then cured at 130° C. for 30 min. This resulted in a printhead with a coated aperture plate that exhibits a solid ink contact angle of ~54° and a solid ink sliding angle of ~10°.

Example 5

Ink-Jetting Coating of Printhead 3

A stainless steel printhead, prepared using the process described in U.S. Pat. No. 5,867,189 was fixed onto an in-house printer platen with the aperture plate face up. A second pattern file, containing the concentric ring pattern around the nozzles, was loaded to the driver computer. The low adhesion coating solution prepared in accordance to the procedure described in Example 1 was filled into the inkjet cartridge. A print job was run to print the concentric coating around the nozzles. The resulting coating was cured at 130° C. for 30 min and further post-cured at 290° C. for 30 min.

The printhead was again fixed onto the in-house printer platen with the aperture plate face up. A second pattern file, containing the rest of the area that is uncoated by the first job, was loaded to the driver computer. The coating solution prepared in accordance to the procedure described in Example 2 was filled into an inkjet cartridge. The print job was then run similarly on the aperture plate. The resulting coating was cured at 130° C. for 30 min. This resulted in a printhead with a solid ink sliding angle of less than ~10°. The fluorinated coating around the nozzle provided a higher contact angle, consequently improving the drool pressure performance.

Comparative Example

A stainless steel printhead was prepared using the process described in U.S. Pat. No. 5,867,189. The aperture plate was coated with a Teflon material, PFA, using the E-Beam sputtering technique. The surface property of the PFA coating was determined according to the procedure in Example 1, and the data are summarized in Table 3. Comparatively, the sliding angle for coating 3 is significantly larger. Low sliding angle translates to low adhesion.

TABLE 3

| Coating | Solid Ink Contact Angle (Sliding Angle) | UV Ink Contact Angle (Sliding Angle) |
|---|---|---|
| 3 (PFA) | 85.0° (~70°) | 63.0° (flowing leaving ink residue) |

What is claimed is:

1. A method for producing an inkjet printhead, the method comprising:

aligning and stacking together an aperture plate and a plurality of jetstack sheets;

bonding together the aperture plate and the plurality of jetstack sheets;

after the bonding step, depositing a layer of coating material to a major surface of the aperture plate by inkjet printing to form a coating on at least a portion of an outlet surface of the aperture plate; and curing the layer of coating material to form a cured coating.

2. The method of claim 1, wherein the cured coating is configured so that ultra-violet gel ink and solid ink in contact with the cured coating exhibit a sliding angle of 1° to less than 30° and a contact angle larger than 40°.

3. The method of claim 1, wherein the layer of coating material deposited by inkjet printing is cured at a temperature of 130° C. for 30 minutes to 2 hours and optionally post-cured at a temperature of from 250° C. to 300° C. for 30 minutes to 2 hours.

4. The method of claim 2, wherein the coating material comprises:

a first isocyanate compound;

a hydroxyl functionalized fluoro-crosslinking material; and optionally a second isocyanate compound.

5. The method of claim 4, wherein the first isocyanate compound is selected from the group consisting of diphenylmethane diisocyanate (MDI); toluene diisocyanate (TDI); hexamethylene diisocyanate (HDI); isophorone diisocyanate (IPDI); hydrogenated MDI; tetra-methyl xylene diisocyanate; naphthalene diisocyanate; cyclohexylene diisocyanate; trimethylhexamethylene diisocyanate; bis(4-isocyanatocyclohexyl)methane; uretidione dimers of monomeric diisocynates HDI, IPDI, TDI, and MDI; cyclotrimerized isocyanurates of monomeric diisocynates HDI, IPDI, and TDI; oligomers, polymers, and copolymers containing at least one isocyanate (—NCO) functional group; and mixtures thereof.

6. The method of claim 4, wherein the hydroxyl functionalized fluoro-crosslinking material is a dihydroxy perfluoropolyether compound having a formula:

$$HOCH_2CF_2O(CF_2CF_2O)_a(CF_2C)_bCF_2CH_2OH$$

where:

a and b are independently integers in a range of from 0 and 100, provided that at least one of a and b is not 0.

7. The method of claim 4, wherein the second isocyanate compound is selected from the group consisting of diphenylmethane diisocyanate (MDI); toluene diisocyanate (TDI); hexamethylene diisocyanate (HDI); isophorone diisocyanate (IPDI); hydrogenated MDI; tetra-methyl xylene diisocyanate; naphthalene diisocyanate; cyclohexylene diisocyanate; trimethylhexamethylene diisocyanate; bis(4-isocyanatocyclohexyl)methane; uretidione dimers of monomeric diisocynates HDI, IPDI, TDI, and MDI; cyclotrimerized isocyanurates of monomeric diisocynates like HDI, IPDI, and TDI; oligomers, polymers, and copolymers containing at least one isocyanate (—NCO) functional group; and mixtures thereof.

8. The method of claim 4, wherein the cured coating exhibits a contact angle of greater than 40° and a sliding angle 1° to less than 30° with solid ink and UV gel ink after the cured coating is soaked in molten wax ink or UV ink at temperatures ranging from 80° C. to 150° C. for 48 hours.

9. The method of claim 2, wherein the coating material comprises:

a polymer or oligomer containing an isocyanate functional group;

a polymer or oligomer containing a hydroxyl functional group;

a hydroxyl functionalized polymer or oligomer containing at least one polysiloxane unit; and optionally, a hydroxyl functionalized fluoro-crosslinking material.

10. The method of claim 9, wherein the polymer or oligomer containing an isocyanate functional group is selected from the group consisting of diphenylmethane diisocyanate (MDI); toluene diisocyanate (TDI); hexamethylene diisocyanate (HDI); isophorone diisocyanate (IPDI); hydrogenated MDI; tetra-methyl xylene diisocyanate; naphthalene diisocyanate; cyclohexylene diisocyanate; trimethylhexamethylene diisocyanate; bis(4-isocyanatocyclohexyl)methane; uretidione dimers of monomeric diisocynates HDI, IPDI, TDI, and MDI; cyclotrimerized isocyanurates of monomeric diisocynates HDI, IPDI, and TDI; and mixtures thereof.

11. The method of claim 9, wherein the hydroxyl functionalized polymer or oligomer containing at least one polysiloxane unit is a polymer consisting of polysiloxane side-chains on a hydroxyl-functional polyacrylate backbone.

12. The method of claim 9, wherein the hydroxyl functionalized fluoro-crosslinking material is a dihydroxy perfluoropolyether compound having a formula:

$$HOCH_2CF_2O(CF_2CF_2O)_a(CF_2O)_bCF_2CH_2OH$$

where:

a and b are independently integers in a range of from 0 and 100, provided that at least one of a and b is not 0.

13. The method of claim 3, wherein the cured coating layer has a thickness in a range of from 500 to 5,000 nm.

14. The method of claim 1, wherein the cured coating exhibits a solid ink contact angle of greater than 45°.

15. The method of claim 1, wherein the cured coating exhibits solid ink and UV gel ink sliding angles of less than 30°.

16. A method for producing an inkjet printhead, the method comprising:

aligning and stacking together an aperture plate and a plurality of jetstack sheets;

bonding together the aperture plate and the plurality of jetstack sheets;

depositing a first coating material on a major surface of the aperture plate around at least one nozzle of the aperture plate;

depositing a second coating material on another portion of the major surface of the aperture plate not being coated by the first coating material; and curing the first coating material and the second coating material to form a first cured coating and a second cured coating;

wherein the first coating material is deposited by ink jet printing and cured, followed by the second coating material being deposited by inkjet printing and cured.

17. The method of claim 16, wherein the first cured coating is configured so that ultra-violet gel ink and solid ink in contact with the first cured coating exhibit a sliding angle of 1° to less than 30° and a contact angle larger than 45°.

18. The method of claim 16, wherein the second cured coating is configured so that ultra-violet gel ink and solid ink in contact with the second cured coating exhibit a sliding angle of 1° to less than 30° and a contact angle larger than 40°.

19. The method of claim 16, wherein the first coating material comprises:

a first isocyanate compound;

a hydroxyl functionalized fluoro-crosslinking material; and optionally a second isocyanate compound.

20. The method of claim 19, wherein the first isocyanate compound is selected from the group consisting of diphenylmethane diisocyanate (MDI); toluene diisocyanate (TDI); hexamethylene diisocyanate (HDI); isophorone diisocyanate (IPDI); hydrogenated MDI; tetra-methyl xylene diisocyanate; naphthalene diisocyanate; cyclohexylene diisocyanate; trimethylhexamethylene diisocyanate; bis(4-isocyanatocyclohexyl)methane; uretidione dimers of monomeric diisocynates HDI, IPDI, TDI, and MDI; cyclotrimerized isocyanurates of monomeric diisocynates like HDI, IPDI, and TDI; oligomers, polymers, and copolymers containing at least one isocyanate (—NCO) functional group; and mixtures thereof.

21. The method of claim 19, wherein the hydroxyl functionalized fluoro-crosslinking material is a dihydroxy perfluoropolyether compound having a formula:

$$HOCH_2CF_2O(CF_2CF_2O)_a(CF_2O)_bCF_2CH_2OH$$

where:

a and b are independently integers in a range of from 0 and 100, provided that at least one of a and b is not 0.

22. The method of claim 16, wherein the second coating material comprises:

a polymer or oligomer containing an isocyanate functional group;

a polymer or oligomer containing a hydroxyl functional group;

a hydroxyl functionalized polymer or oligomer containing at least one polysiloxane unit; and optionally, a hydroxyl functionalized fluoro-crosslinking material.

23. The method of claim 22, wherein the polymer or oligomer containing an isocyanate functional group is selected from the group consisting of diphenylmethane diisocyanate (MDI); toluene diisocyanate (TDI); hexamethylene diisocyanate (HDI); isophorone diisocyanate (IPDI); hydrogenated MDI; tetra-methyl xylene diisocyanate; naphthalene diisocyanate; cyclohexylene diisocyanate; trimethylhexamethylene diisocyanate; bis(4-isocyanatocyclohexyl)methane; uretidione dimers of monomeric diisocynates HDI, IPDI, TDI, and MDI; cyclotrimerized isocyanurates of monomeric diisocynates HDI, IPDI, and TDI; and mixtures thereof.

24. The coating of claim 22, wherein the hydroxyl functionalized polymer or oligomer containing at least one polysiloxane unit is a polymer consisting of polysiloxane sidechains on a hydroxyl-functional polyacrylate backbone.

25. The coating of claim 22, wherein the hydroxyl functionalized fluoro-crosslinking material is a dihydroxy perfluoropolyether compound having a formula:

$$HOCH_2CF_2O(CF_2CF_2O)_a(CF_2O)_bCF_2CH_2OH$$

where:

a and h are independently integers in a range of from 0 and 100, provided that at least one of a and b is not 0.

26. The method of claim 16, wherein the first and the second cured coating layers have a thickness in a range of from 500 to 5,000 nm.

* * * * *